United States Patent [19]
Shiki

[11] 3,942,118
[45] Mar. 2, 1976

[54] DELAY TIME CONTROLLER FOR USE IN A GROUP-DELAY EQUALIZER

[75] Inventor: Haruo Shiki, Tokyo, Japan

[73] Assignee: Nippon Electric Company Limited, Tokyo, Japan

[22] Filed: Sept. 30, 1974

[21] Appl. No.: 510,196

[30] Foreign Application Priority Data
Oct. 1, 1973  Japan.............................. 48-110816

[52] U.S. Cl................................. 325/303; 325/431
[51] Int. Cl.²........................................ H04B 1/06
[58] Field of Search .................... 325/303, 301–302, 325/304–307, 431, 434, 438, 446, 430, 4, 9, 11, 65; 333/29, 28; 328/177; 343/176, 179, 180

[56] References Cited
UNITED STATES PATENTS

| | | | |
|---|---|---|---|
| 2,633,492 | 3/1953 | Ring.............................. | 333/28 R X |
| 3,019,296 | 1/1962 | Schelleng.............................. | 333/29 |
| 3,119,067 | 1/1964 | Wohlenberg et al. .............. | 325/434 |
| 3,183,447 | 5/1965 | Fair......................................... | 333/29 |

*Primary Examiner*—Robert L. Griffin
*Assistant Examiner*—Robert Hearn
*Attorney, Agent, or Firm*—Sughrue, Rothwell, Mion, Zinn & Macpeak

[57] ABSTRACT

A delay circuit provides a flat delay versus frequency characteristic over a first band of frequencies by combining two delay equalizers having opposite signed and equal magnitude slopes of delay versus frequency over two different bands of frequencies. The first frequency band is translated to a second band which is applied to the first of two delay equalizers. The latter has a transfer characteristic which is a substantially constant slope of delay versus frequency for a band encompassing and much wider than said second band. The output of the latter element is translated back to the first frequency band. The first band, either prior to the initial frequency translation or subsequent to the second frequency translation, is applied to a second delay equalizer. The characteristic slopes of the two delay equalizers are of substantially equal magnitude but of opposite sign.

8 Claims, 5 Drawing Figures

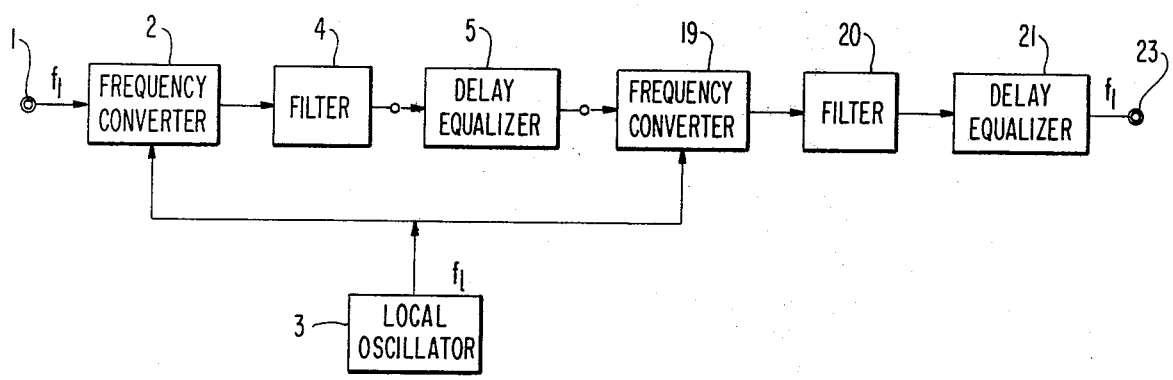
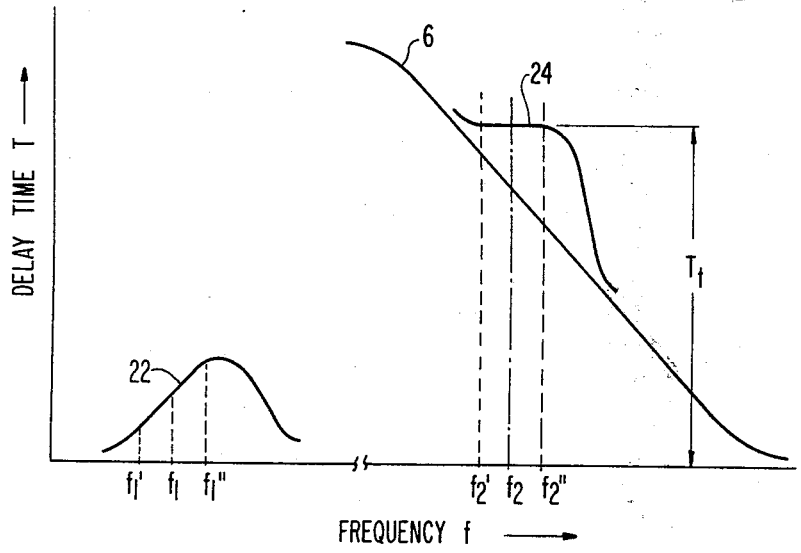
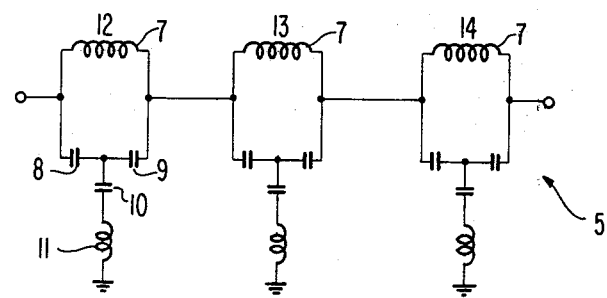

DELAY TIME CONTROLLER FOR USE IN A GROUP-DELAY EQUALIZER

BACKGROUND OF THE INVENTION

The present invention relates in general to a delay time controlling circuit for use in a group-delay equalizer for R. F. signals, and more particularly, to a delay time controlling circuit capable of minimizing the difference in absolute delay time between two or more broad-band receiver input signals so that it may be adaptable to diversity reception of high speed data signals or super-multiplex telephone signals.

In long distance transmission of microwaves, transmission quality is often deteriorated due to fading. In order to reduce the deterioration of transmission quality caused by the phenomenon, diversity reception has been employed. In a diversity reception it is important to minimize the phase difference between two or more received demodulation signals over a broad frequency band. For instance, in the case of transmitting television signals in an over-the-horizon microwave relay system, certain amount of fluctuations is inevitable in reception time of the respective received waves upon diversity reception because the microwave scattering layer in the atmosphere fluctuates from time to time. Therefore, if the two received waves are simply synthesized, the phase relation therebetween can be such that the received signals may be offset with respect to each other. Therefore, in the case of color television signals, a variation in the intensity and/or phase of the color signals results. Accordingly, a device for equalizing the difference between absolute values of transmission time of the respective diversity signals is desired.

In the conventional absolute delay time controllers, the adjustment is made so that the time difference between the two received signals may be minimized by adjusting the length of a coaxial line or by connecting fixed delay time equalizers in cascade. Every one of these conventional delay time controllers requires mechanical adjustment, which is time consuming and difficult to automate.

It is therefore one object of the present invention to provide a novel delay time controller which can regulate the delay time electronically.

Another object of the present invention is to provide a delay time controller which can easily and automatically bring the delay time difference down to zero.

SUMMARY OF THE INVENTION

The delay time controller of the present invention comprises a first frequency converter for converting an input signal in a first frequency band into a signal in a second frequency band, a second frequency converter for converting said signal in said second frequency band into another signal in said first frequency band, a variable-frequency local oscillator connected in common to said first and second frequency converters, a first delay equalizer connected between said first and second frequency converters whose frequency response in delay time has a slope over a broad range in said second frequency band, and a second delay equalizer inserted in the path of said signals in said first frequency band whose frequency response in delay time within a desired range in said first frequency band is of such nature as to offset said slope of said frequency response in said second frequency band. Due to the aforementioned structural feature, the present invention presents an advantage that the delay time of the signal in said first frequency range can be varied continuously by varying the frequency range where the above-described offset of the slope of the frequency response is achieved through the step of varying the frequency of an oscillation signal of said variable-frequency local oscillator.

BRIEF DESCRIPTION OF THE DRAWINGS

The above-mentioned and other features and objects of this invention will become more apparent by reference to the following description taken in conjunction with the accompanying drawings, in which:

FIG. 1 is a block diagram showing one preferred embodiment of the present invention;

FIG. 2 is a frequency response diagram showing one example of delay time versus frequency characteristic curves presented by the embodiment shown in FIG. 1;

FIG. 3 is a detailed circuit diagram of one example of the delay equalizer in FIG. 1;

DETAILED DESCRIPTION OF THE PREFERRED EMBODIMENT

Figure 4:
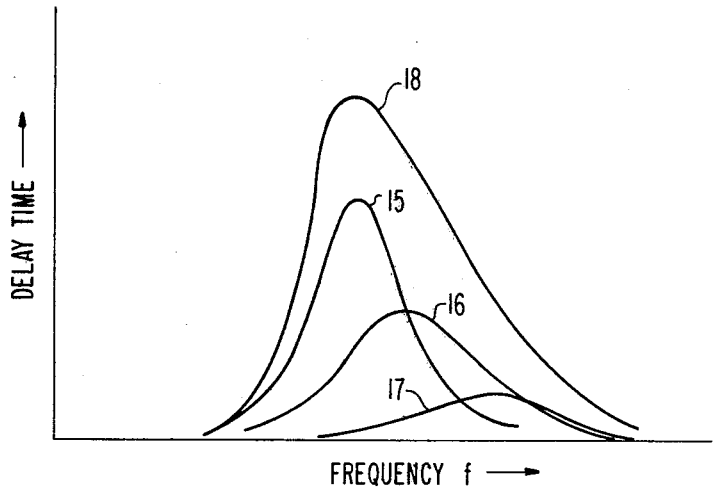
FIG. 4 is a frequency response diagram showing one example of delay time versus frequency characteristic curves presented by the circuit in FIG. 3.

Now the present invention will be described in more detail with reference to the accompanying drawings. In FIG. 1, reference numeral 1 designates an input terminal. A signal at a frequency $f_1$, appearing at the input terminal 1 is fed to a first frequency converter 2. To the frequency converter 2 is also applied a local oscillation signal having a frequency $f_l$ supplied from a local oscillator 3. An output from the converter 2 is applied to a filter 4, where only one frequency component such as, for example, a component having a frequency $f_2 = f_l - f_1$ is selected, and thus a frequency-converted signal is obtained. This converted signal is fed to a first delay equalizer 5 which has a relatively steep slope characteristic over a broad range that is broader than a frequency bandwidth of the input signal, for example, as shown by a curve in FIG. 2, where a frequency $f$ is taken along an abscissa and a delay time $\tau$ is taken along an ordinate.

Such a delay equalizer can be composed, for example, of a cascade connection of a plurality of all-frequency-pass type filters as shown in FIG. 3. As illustrated the equalizer comprises a plurality of bridged-T circuits in which only the phase is varied without reducing the amplitude; each said circuit consisting of a parallel resonance circuit including a coil 7 and a series connection of capacitors 8 and 9 and a series resonance circuit including a capacitor 10 and a coil 11 connected across a junction between the capacitors 8 and 9 and a common potential point such as the ground. The delay equalizer 5 can be composed of a cascade connection of three bridged-T circuits 12, 13 and 14 as shown in FIG. 3. By properly selecting the resonance frequencies and Q-values of the respective bridged-T circuits, for example by selecting successively rising resonance frequencies and successively lowering Q-values in the order of circuits 12, 13 and 14, the frequency response characteristics of these bridged-T circuits 12, 13 and 14 can be chosen as shown by curves 15, 16 and 17, respectively, in FIG. 4. A composite frequency response characteristic of the bridged-T circuits 12, 13 and 14 which can be obtained by synthesizing the curves 15, 16 and 17, is represented by curve 18 in the same diagram. The sloped portion of said curve 18 on its right side can be simulated to the desired slope curve 6 as shown in FIG. 2.

Now returning to the explanation of the device shown in FIG. 1, the signal having a frequency $f_2$ which has been passed through the first delay equalizer 5 is fed to a second signal converter 19, in which the frequency is converted into a frequency in the original input signal frequency band by means of a local oscillation signal supplied from oscillator 3. More particularly, an output of the converter 19 is applied to a filter 20, where a signal component having a frequency $f_1 = f_l - f_2$ is selected. This filter output is applied to a second delay equalizer 21, which has a slope in a delay versus frequency response opposite to the delay versus frequency response of the first delay equalizer 5 at the desired frequency range, that is, in the input signal frequency band from $f_1'$ to $f_1''$. More particularly, the frequency response characteristic of delay equalizer 21 is such that its slope in the frequency band $f_1'$ to $f_1''$ is opposite to the slope of the curve 6 as shown by a curve 22 in FIG. 2. The output terminal of the delay equalizer 21 forms an output terminal of the entire delay time controller. The second delay equalizer 21 can be realized by making use of a single stage of bridged-T circuit of all-frequency-pass type as shown in FIG. 3.

According to the aforementioned circuit construction, the frequency response curve 22 in FIG. 2 is transferred to a frequency band centered at a frequency $f_2$, and since the overall delay frequency response characteristic between the input terminal 1 and the output terminal 23 is formed as a sum of this converted characteristic curve and the characteristic curve 6, said overall response characteristic becomes a flat characteristic having fixed delay time $\tau_t$ in the frequency band $f_2' \sim f_2''$ to which the original frequency band $f_1' \sim f_1''$ is converted as shown by a curve 24, because the slopes of the curves 6 and 22 are offset with each other. If the oscillation frequency $f_l$ of the local oscillator 3 is raised, then the converted frequency $f_2$ becomes also higher, so that the delay introduced by the first delay equalizer 5 is reduced along the slope of the curve 6, and therefore, the overall delay time $\tau_t$ that is formed by superposing the frequency response characteristic of the second delay equalizer 21 on the curve 6, is also reduced. Similarly, if the local oscillation frequency $f_l$ is lowered, then the overall delay time $\tau_t$ is increased. In other words, by continuously varying the local oscillation frequency, the overall delay time $\tau_t$ can be varied continuously within the frequency range where the characteristic curve 6 has linearity. The converted frequency $f_2$ is selected, for example, about 2.5 to 4.5 times as high as the original frequency $f_1$. It is well known that a variable-frequency oscillator to be used as the local oscillator 3 can be controlled so as to vary its oscillation frequency electronically, and therefore, the controller can be constructed in such manner that the control of the overall delay time may be achieved electronically. In addition, the delay time controller according to the present invention can be composed of generally known circuits. For example, instead of inserting the delay equalizer 21 between the filter 20 and the output terminal 23 as shown in FIG. 1, it may be inserted between the input terminal 1 and the frequency converter 2.

Figure 5:
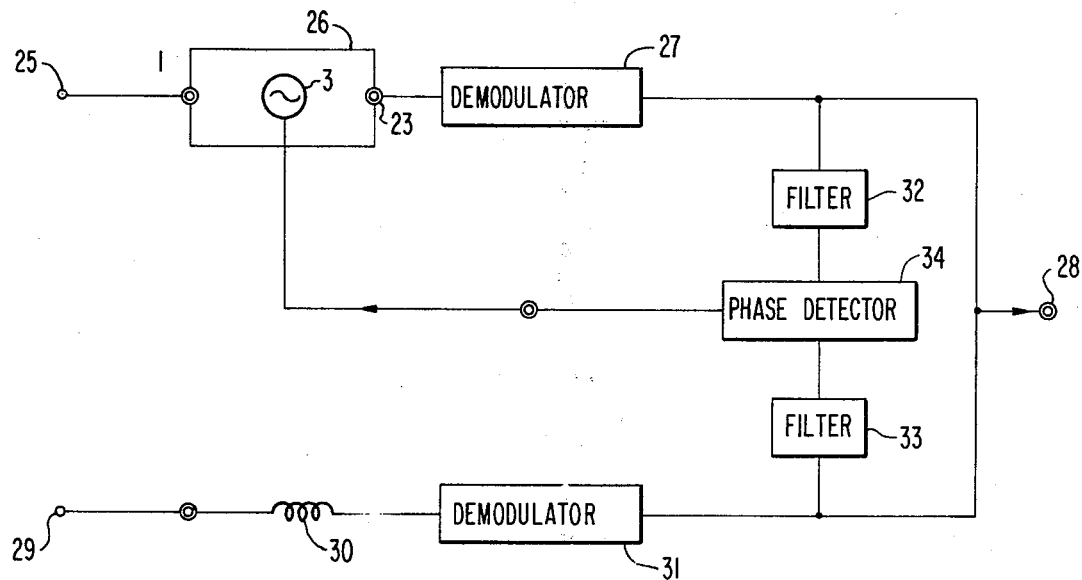
FIG. 5 is a block diagram of a diversity receiver incorporating the delay time controller shown in FIG. 1.

An example of the application of the above-described delay time controller according to the present invention to a space diversity receiver, is illustrated in FIG. 5. More particularly, a receiver I. F. input terminal 25 in one of the reception paths of the space diversity receiver, is connected to an input terminal 1 of a delay time controller 26 according to the present invention. An output signal emitted from an output terminal 23 of the controller 26 is demodulated by an FM demodulator 27 and fed to a synthesized output terminal 28. A signal applied to a receiver I. F. input terminal 29 in the other reception path of the space diversity receiver, is fed via a fixed delay circuit 30 to an FM demodulator 31. The demodulated output is fed to the synthesized output terminal 28. The fixed delay circuit 30 serves to compensate for an average path length difference between the two reception paths in the space diversity receiver.

From the respective demodulated outputs of the FM demodulator 27 and 31 are extracted phase reference pilot signals through filters 32 and 33, respectively. These pilot signals are detected by a phase detector 34 which controls the oscillation frequency of the local oscillator 3 (for instance, a voltage-controlled oscillator) in the delay time controller 26 in dependence upon the phase difference between the inputs to detector 34. As a result, control is made so that the pilot signals extracted from the respective reception paths may be always in-phase, and thus the demodulated signals emitted from the FM demodulators 27 and 31 can be synthesized in an inphase relation to each other at the synthesized output 28. In addition, as in the case of the conventional delay time controllers, generally not only the compensation for the transmission time difference between two received signals, but also an adjustment of the amplitudes of the respective received signals upon synthesizing must be achieved.

As described above, according to the present invention there is provided a delay time controller, in which an absolute delay time can be controlled electronically on a continuous basis, and thus it can be controlled quickly, and which can operate satisfactorily, when it is applied to the case where a relative delay time between a plurality of reception signals varies with time as in the case with the over-the-horizon microwave relay system in order to automatically compensate for the delay time variation.

While we have described above the principle of our invention in connection with specific apparatus, it is to be clearly understood that this description is made only by way of example and not as a limitation to the scope of the invention as set forth in the object thereof and in the accompanying claims.

What is claimed is:

1. A delay time controller comprising a first frequency converter for converting an input signal in a first frequency band into a signal in a second frequency band, a second frequency converter for converting said signal in said second frequency band into another signal in said first frequency band, a variable-frequency local oscillator connected in common to said first and second frequency converters, a first delay equalizer connected between said first and second frequency converters whose frequency response versus delay time has a slope over a broad range in said second frequency band, and a second delay equalizer inserted in a signal path of said signal in said first frequency band whose frequency response versus delay time within a desired range in said first frequency band is of such nature as to offset said slope of said frequency response of said first delay equalizer over said second frequency band.

2. A time delay circuit having a substantially flat delay response over a first frequency band comprising:
a serial signal path including first frequency converter means for frequency converting signals in said first frequency band into signals in a second frequency band, second frequency converter means for converting signals in said second frequency band into signals in said first frequency band, said second frequency converter means being connected in said serial signal path at a point subsequent to said first frequency converter means whereby the sequence of conversion is from said first to said second to said first frequency band,
first delay means interposed between said first and second frequency converter means and having a frequency versus delay time characteristic which has a substantially constant slope $\Delta\tau_2/\Delta f_2$ over a frequency band which encompasses and is substantially larger than said second frequency band, where $\tau_2$ is the delay time imparted to a signal of frequency $f_2$, and
a second delay means interposed in said signal path to receive said signals in said first band and having a frequency versus delay characteristic which has a substantially constant slope $\Delta\tau_1/\Delta f_1$ over a band encompassing said first frequency band which slope is of substantially equal value but opposite in sign to said slope $\Delta\tau_2/\Delta f_2$, whereby the combined delay characteristics of the first and second delay means results in a substantially flat delay versus frequency for the said signals in said first frequency band.

3. A time delay circuit as claimed in claim 2 further comprising means for electronically varying the center of said second frequency band.

4. A time delay circuit as claimed in claim 2 wherein said first frequency converter means comprises:
first mixer means, having an input adapted to receive signals in said first frequency band $f_1$ and a second input for receiving local oscillator signals at frequency $f_l$, for providing at an output thereof the mixed frequencies $f_1$ and $f_l$, and
first filter means connected to the output of said first mixer means for passing one component $f_2$ of said mixed frequencies to an output thereof.

5. A time delay circuit as claimed in claim 4 wherein said second frequency convertor comprises:
second mixer means having an input adapted to receive signals in said second frequency band $f_2$ and a second input for receiving local oscillator signals at frequency $f_l$, for providing at an output thereof the mixed frequencies $f_2$ and $f_l$, and
second filter means connected to the output of said first mixer means for passing one component $f_1$ of said mixed frequencies to an output thereof.

6. A time delay circuit as claimed in claim 5 further comprising an electronically controlled frequency variable local oscillator, the output of said local oscillator being connected to the respective second inputs of said first and second mixer means.

7. A time delay circuit as claimed in claim 2 wherein said second delay means is connected in said signal path at a point subsequent to said second frequency converter means.

8. A time delay circuit as claimed in claim 2 wherein said second delay means is connected to said signal path at a point in advance of said first frequency converter means.

* * * * *

UNITED STATES PATENT OFFICE
CERTIFICATE OF CORRECTION

PATENT NO. : 3,942,118
DATED : March 2, 1976
INVENTOR(S) : Haruo Shiki

It is certified that error appears in the above-identified patent and that said Letters Patent are hereby corrected as shown below:

IN THE SPECIFICATION

Column 2, line 39 - delete "$f_1$" (letter) and insert --$f_1$-- (numeral)

Column 4, line 44 - delete "in" and insert -- is--

IN THE CLAIMS

Column 6, line 34 - delete "to" and insert -- in --

Signed and Sealed this

Twentieth Day of July 1976

[SEAL]

Attest:

RUTH C. MASON
Attesting Officer

C. MARSHALL DANN
Commissioner of Patents and Trademarks